US011972878B2

(12) United States Patent
Forasacco

(10) Patent No.: US 11,972,878 B2
(45) Date of Patent: Apr. 30, 2024

(54) BUSBAR SUPPORT, MADE UP OF TWO PARTS, COMPRISING AN ATTACHMENT BETWEEN THE TWO PARTS

(71) Applicant: Airbus Operations (S.A.S.), Toulouse (FR)

(72) Inventor: Sébastien Forasacco, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/898,810

(22) Filed: Aug. 30, 2022

(65) Prior Publication Data
US 2023/0060337 A1 Mar. 2, 2023

(30) Foreign Application Priority Data
Aug. 31, 2021 (FR) ........................ 2109088

(51) Int. Cl.
*H01B 17/18* (2006.01)
*F16M 13/02* (2006.01)

(52) U.S. Cl.
CPC ............. *H01B 17/18* (2013.01); *F16M 13/02* (2013.01); *B64D 2221/00* (2013.01)

(58) Field of Classification Search
CPC .... H01B 17/18; F16M 13/02; B64D 2221/00; Y10T 403/70; Y10T 403/7043; Y10T 403/7092
USPC ........... 248/220.21, 220.22, 221.11, 222.11, 248/222.12, 222.51, 222.52, 223.21, 248/223.41, 224.61, 225.21, 229.1, 248/229.12, 229.13, 229.14, 229.2, 248/229.22, 229.23, 229.24; 174/68.2, 174/86, 87, 88 B, 88 S, 70 B, 99 B, 542, 174/560, 561, 563
See application file for complete search history.

(56) References Cited

U.S. PATENT DOCUMENTS

| 6,100,473 A | 8/2000 | Wagener | |
|---|---|---|---|
| 2004/0122191 A1* | 6/2004 | Arjunan | ................ C08F 110/06 526/348.3 |
| 2013/0169541 A1* | 7/2013 | Cabos | .................. G08G 5/0021 705/342 |

(Continued)

FOREIGN PATENT DOCUMENTS

| DE | 197 12 363 C1 | 6/1986 |
|---|---|---|
| FR | 2 579 006 A1 | 9/1986 |

(Continued)

OTHER PUBLICATIONS

French Search Report for Application No. 2109088 dated May 3, 2022.

*Primary Examiner* — Alfred J Wujciak
(74) *Attorney, Agent, or Firm* — KDW Firm PLLC

(57) ABSTRACT

A support for a busbar including two parts each having two surfaces substantially planar and perpendicular to one another and arranged to form, together with the two surfaces of the other part from the two parts, a through-cavity or a passage, a base including a hole or a fastener, and, a shape complementary to a shape of the other of the two parts, the shape being arranged to form, together with the shape of the other of the two parts, an attachment between the two parts. Advantageously, it is possible to obtain a support for a busbar, the support being robust, reliable, and inexpensive and able to be mounted in an easy and rapid manner.

13 Claims, 4 Drawing Sheets

(56) References Cited

U.S. PATENT DOCUMENTS

2017/0055363 A1* 2/2017 Ankarbjörk ............ H05K 7/186

FOREIGN PATENT DOCUMENTS

| FR | 3 067 522 A1 | 12/2018 |
|---|---|---|
| WO | WO 2019/218061 A1 | 11/2019 |

* cited by examiner

BUSBAR SUPPORT, MADE UP OF TWO PARTS, COMPRISING AN ATTACHMENT BETWEEN THE TWO PARTS

CROSS-REFERENCE TO RELATED APPLICATION

This application claims priority to French patent application number 2109088 filed on Aug. 31, 2021, the entire disclosure of which is incorporated by reference herein.

TECHNICAL FIELD

The disclosure herein relates to a busbar support. The disclosure herein relates notably to a busbar support made up of two parts for aircraft electrical systems.

BACKGROUND

Electricity plays an increasingly important role in the on-board systems of aircraft, which change constantly in terms of architecture, notably to meet requirements with regard to safety, mass, cost and the environment, and also needs with regard to industrialization and convenience. Thus, an aircraft has numerous electrical and electronic circuits requiring various electrical power supply lines and signal transmission lines, useful to the flight functions of the aircraft. In this context, connections of the busbar type are commonly used, for example from on-board electric power generation systems to different electrical systems of the aircraft.

Such busbars have to be assembled in a reliable manner, and the mounting operations can be time-consuming and burdensome in order to meet the reliability requirements.

The situation may be improved.

SUMMARY

An object of the disclosure herein is a simple and reliable busbar support which can be assembled in an easy and rapid manner and which requires only a minimum number of ancillary or supplementary elements such as screws, nuts or washers.

To this end, what is proposed is a busbar support comprising two parts each having:
  two surfaces which are arranged so as to form, together with the two surfaces of the other part from among the two parts, a through-cavity or a passage,
  a base comprising a hole or a fastener, and,
  a shape complementary to a shape of the other one of the two parts, the shape being arranged so as to form, together with the complementary shape of the other one of the two parts, an attachment between the two parts.

Advantageously, this makes it possible to obtain a simple, robust, reliable and inexpensive busbar support which can be assembled in an easy and rapid manner, while still consequently limiting the FOD (Foreign Object Debris, denoting a foreign body present in a system) risks.

The busbar support according to the disclosure herein may also have the following features, considered alone or in combination:
  The two surfaces of each of the two parts are substantially planar and perpendicular to one another. Advantageously, such a configuration is particularly suitable for busbars having a square or rectangular overall section.
  The attachment between the two parts comprises a hook or has a profile in the form of a hook, this making it possible to simplify the mounting and to create a pivot point between the two parts of the support.
  The bases of the two parts together form a planar sole, which advantageously makes it possible to fasten the support to a substrate in a simple manner in two steps (pre-assembly of a first part of the support, then assembly of the other part after a busbar has been positioned on or against the first part).
  The attachment between the two parts is configured to limit the movement of one of the two parts with respect to the other of the two parts in at least two directions of movement perpendicular to one another, this simplifying the assembly operation by defining an alignment and by then limiting the movements of one part of the support with respect to the other, thus creating a guide.
  The two parts are manufactured from an insulating material, this advantageously reducing the risks of a short circuit.
  The insulating material is a polymer or an elastomer having a melting temperature greater than 150° C. Thus, the material offers a good compromise between rigidity and flexibility and withstands high temperatures, created notably by the Joule effect.
  The through-cavity or the passage has a parallelepipedal overall shape, which is particularly suitable for easy positioning and secure holding of busbars having a square or rectangular overall section.

Also, a subject of the disclosure herein is a busbar fastening assembly comprising a substrate, two screws or fixing devices, and a busbar support as described above, the assembly being configured to receive a busbar positioned in the through-cavity or the passage of the support, when the two parts are assembled on the substrate. Such an assembly then makes it possible to fasten a busbar with respect to the substrate in a robust and reliable manner and with a minimum number of ancillary elements.

Another subject of the disclosure herein is an aircraft comprising a busbar support as described above or a busbar fastening assembly as described above.

According to one embodiment, the aircraft comprises at least one electric propulsion motor.

BRIEF DESCRIPTION OF THE DRAWINGS

The above-mentioned features of the disclosure herein, together with others, will become more clearly apparent upon reading the following description of one example embodiment, the description being given with reference to the appended figures, in which.

DETAILED DESCRIPTION

Figure 1:
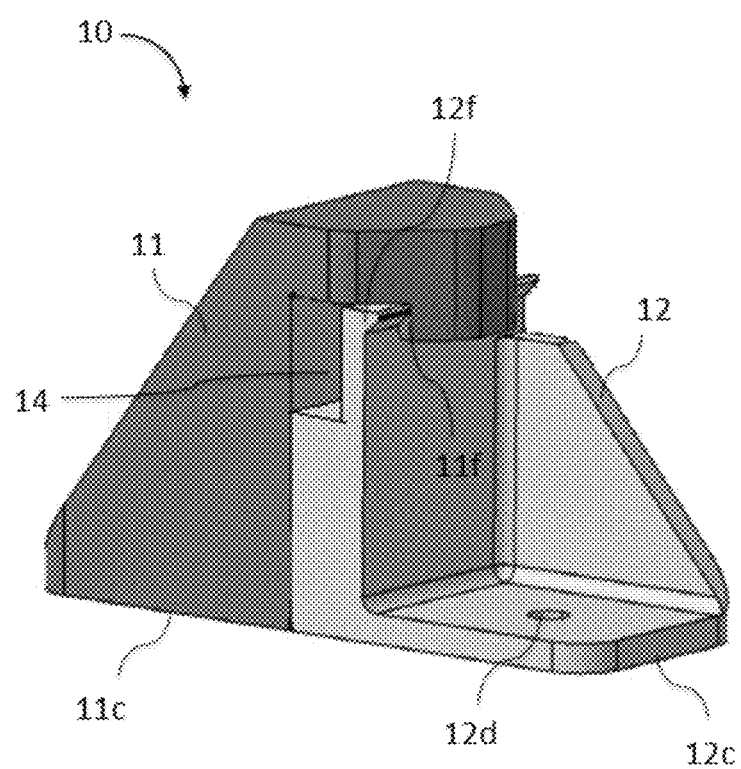
FIG. 1 is a perspective view of a busbar support made up of two parts according to one embodiment.

FIG. 1 illustrates a busbar support 10. In this case, the term "busbar" denotes a rigid element for distributing electrical energy within an electrical circuit. The busbar support 10 comprises two parts 11 and 12 which are arranged so as to be assembled facing, and in contact with, one another, and so as to be able to bear against, and be fastened to, a common (support) substrate. The two parts 11 and 12 of the busbar support 10 are configured to form, after assembly (mounting), a through-cavity 14 intended to support and hold a busbar in a fixed or substantially fixed position. In this case, the term "through-cavity" denotes an opening or a passage which is arranged in the busbar support 10 after assembly and through which a busbar can be positioned. In other words, the through-opening, or passage, is a space or volume, available in the assembled support 10, which is left free such that a busbar portion can be accommodated and held therein. According to one embodiment, each of the two parts 11 and 12 has two surfaces perpendicular to one another which jointly form an angle in the material such that the two angles thus formed define a through-cavity or passage 14 of parallelepipedal overall shape. Such a shape is particularly suitable for supporting a busbar of square or rectangular section.

According to one embodiment, the two parts 11 and 12, configured to together form the busbar support 10, are independent and movable with respect to one another prior to assembly of the support 10. According to a variant, and in order to facilitate the operations for assembling and positioning the support, the two parts 11 and 12 may be kept connected to one another, but movable with respect to one another, prior to assembly of the support 10, for example by way of a strip made of flexible material. In this case, they are movable with respect to one another while not being completely independent. This latter configuration advantageously allows an operator to be able to rapidly grasp the two parts 11 and 12 in a single movement with a view to assembling the busbar support 10.

According to one embodiment, each of the two parts 11 and 12 has a base, which offers a planar bearing surface permitting fastening to a substrate, and also a vertical sub-part comprising surfaces which at least partially define the through-cavity or passage 14, in combination with surfaces of the vertical sub-part of the other part from among the two parts 11 and 12 of the busbar support 10. According to the example described, each of the parts 11 and 12 of the busbar support 10 therefore has the overall shape of an angle bracket made up of its horizontal base and of its vertical sub-part. According to one embodiment, the parts 11 and 12 may each comprise a reinforcing rib joining its base and its vertical sub-part, for example a rib joining an edge of the base to an edge of the vertical sub-part. The two parts 11 and 12 of the busbar support are configured such that, after assembly, the two bases together form a sole of the busbar support 10, and the two vertical sub-parts are disposed facing one another, preferably partially abutting one another (in contact with one another). The angle bracket-like overall shape of each of the two parts 11 and 12 is advantageously simple and imparts a lightness to each of the parts and an ease of handling for an operator, during the mounting. Furthermore, a configuration of the support with the two parts 11 and 12 having an angle bracket-like overall shape makes it possible, depending on the dimensions and tolerances chosen for the assembled support, for the busbar to be pinched or not pinched. According to one example configuration, a held busbar is held pinched between the two parts 11 and 12 of the support 10. According to another example configuration, the dimensions and/or tolerances of each of the two parts are such that a busbar borne by the support is able to move in translation through the cavity or opening 14 (sliding connection). In this latter case, it is advantageously possible to tolerate expansion phenomena or relative movements, without the support 10 being subjected to unnecessary stresses. According to one embodiment of the disclosure herein, the busbar support 10 is configured to support a busbar of rectangular section in a position in which the rectangular section is disposed vertically, this making it possible for each of the parts to exert a pressure, when the busbar is being pinched, over a greater surface area than if the busbar were positioned in a position in which its rectangular section is disposed horizontally. Of course, according to a variant, and for reasons of bulkiness, for example, the busbar can be positioned between the parts 11 and 12 of the support 10 in a position in which its rectangular section is disposed horizontally.

The part 11 of the busbar support 10 comprises a base 11c, and the part 12 of the busbar support 10 comprises a base 12c. According to one embodiment, each of the bases 11c and 12c comprises a passage hole allowing the part comprising it to be screw-fastened to a support (substrate). According to a variant, the base may possibly not comprise a passage hole configured for screw-fastening, and may then comprise a different fastener suitable for stable fastening to a substrate. For example, a fastener of a base may be in the form of a clip, of a hook configured to be inserted in a perforation of a substrate, or of one or more adhesive-coated surfaces of the base. According to one embodiment, the base 11c comprises a passage hole (not visible in the figure), and the base 12c comprises a passage hole 12d. According to the example shown, the passage hole 12d is a bore configured to allow the base 12c to be fastened to a substrate by a screw or a bolt. According to another variant, one of the two parts (for example the part 12) of the busbar support 10 has a base (12c, according to the example) comprising a hole or structure for fastening to a substrate, and the other of the two parts (11, according to the example described here) has a through-hole or fastener provided for fastening to the other of the two parts (that is to say the part 12). When provision is made for the bases to be fastened by fastening screws, it is however preferable for there to be a hole in each of the two bases, in order to permit a vertical position of a screwdriver-type tool and easy access for this tool, held by an operator, during an operation for assembling the support 10.

Each of the two parts 11 and 12 furthermore has a shape complementary to a shape of the other of the two parts 11 and 12 so as to together form an attachment (or an attachment system) of the two parts 11 and 12 to one another. According to one embodiment, the part 11 of the busbar support 10 has the shape of a hook 11f complementary to a lip 12f arranged in the part 12, the two shapes 11f and 12f being arranged so as to together provide an attachment system between the two parts 11 and 12 of the busbar support 10. According to a variant, the shape 11f is a hook with a non-return element, and the shape 12f is a complementary shape (for example a loop of material, a bore or an opening) in which the non-return hook 11f is inserted, or vice versa. These examples of attachment are not limiting, and various complementary shapes arranged in the parts 11 and 12, respectively, of the busbar support 10 may cooperate so as to implement partial or complete fastening of the two parts 11 and 12 to one another, prior to fastening to a common substrate of the two parts 11 and 12. For example, the shapes 11f and 12f may have hollow cylindrical elements (each comprising a bore) which are aligned and through which a pin can be introduced during the mounting, so as to implement a pivot connection of the hinge type between the two parts 11 and 12, and to facilitate pinching of a busbar, by the support 10, after complete assembly of the support 10 around the busbar, and then on the substrate.

Ingeniously, each of the two parts 11 and 12 is configured to have a shape complementary to a shape of the other of the two parts 11 and 12, and to together form the support 10 having a through-cavity 14 or a passage 14 intended to receive (that is to say to support, hold or pinch) a busbar in a predetermined position, while still being connected to the other part by an attachment or an attachment system, after assembly.

According to one embodiment, one of the parts 11 and 12 is arranged so as to have a shape allowing a busbar to be positioned on this part in a stable manner prior to the positioning of the other one of the parts 11 and 12, so as to facilitate the mounting. According to one example of a shape which facilitates the fitting of a busbar, the vertical sub-part of one of the parts has a horizontal plane and a vertical plane which are configured for the fitting and abutment, respectively, of a busbar. The vertical part of the other one of the parts 11 and 12 then, for its part, has complementary planes, for example a vertical plane and a horizontal plane delimiting the through-opening or passage 14, of parallelepipedal overall shape.

Figure 2:
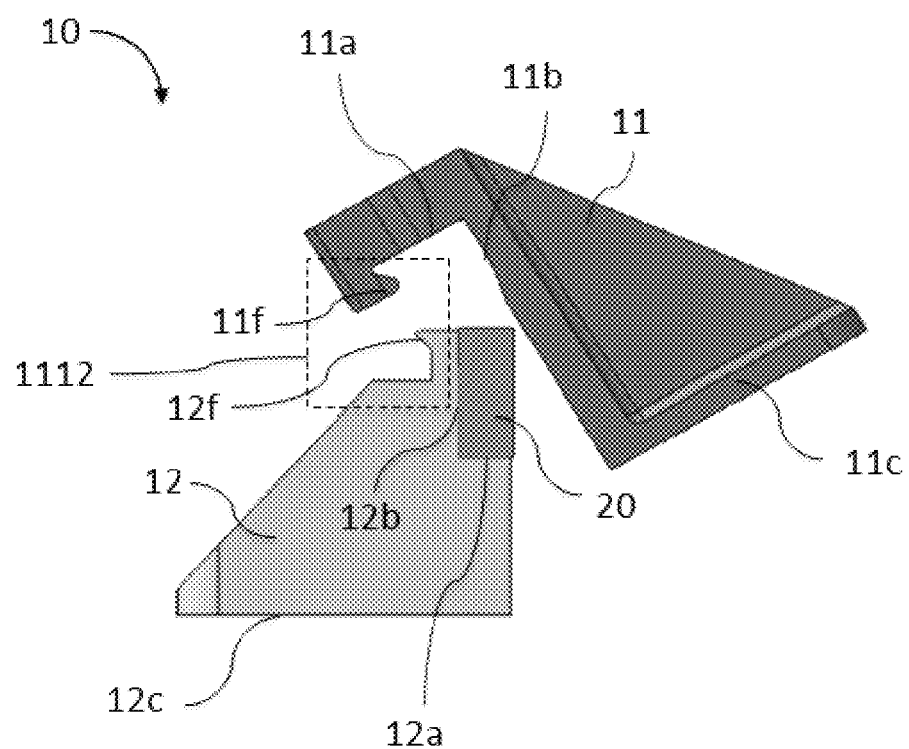
FIG. 2 shows the two parts of the busbar support already shown in FIG. 1, in a position of convergence, during an initial phase of mounting the support around a busbar.
Figure 3:
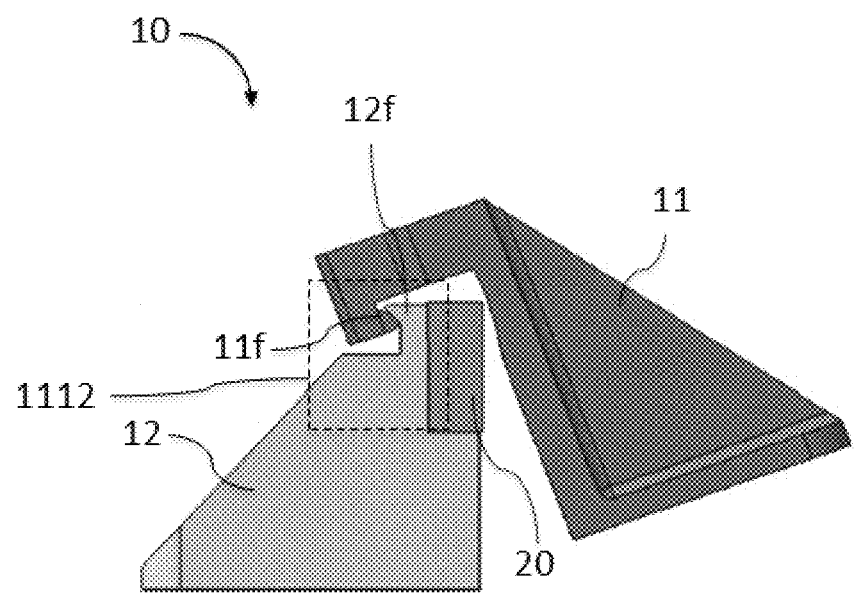
FIG. 3 shows the two parts of the busbar support already shown in FIG. 1 and FIG. 2, during a phase of attachment between the two parts of the support, around a busbar.
Figure 4:
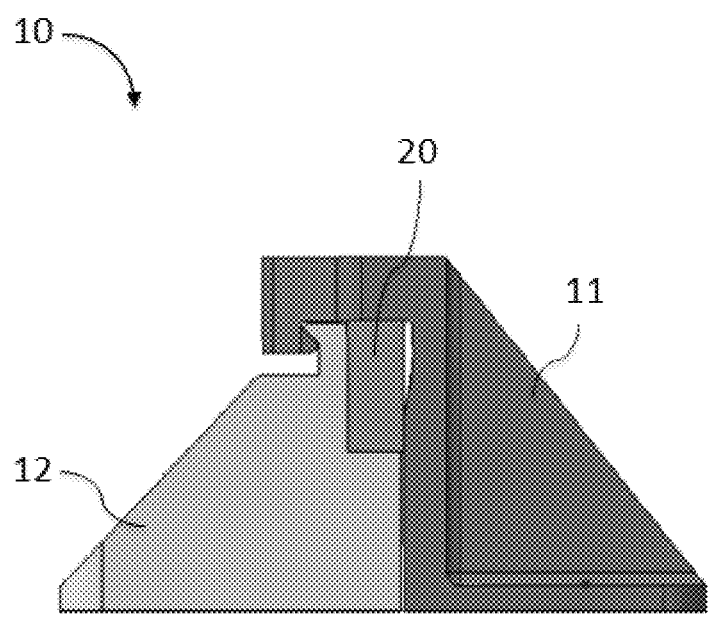
FIG. 4 shows the busbar support already shown in FIG. 1, FIG. 2, and FIG. 3 at the end of mounting of the support around a busbar.

FIG. 2 illustrates an initial step for assembling the two parts 11 and 12 of a support 10 for fastening of a busbar, during which the parts 11 and 12 of the support 10 are brought together after a busbar 20 has been positioned against two surfaces 12a and 12b of the part 12 which are perpendicular to one another and which form an angle allowing wedging of the busbar 20, possibly with a precise fit. According to the example described in FIG. 2, the busbar 20 is of rectangular section, disposed vertically, and the complementary shapes 11f, arranged at the upper end of the vertical sub-part of the part 11, and 12f, arranged at the upper end of the vertical sub-part of the part 12, are of the hook type and lip (protruding edge) type, respectively. According to one mounting example, the part 12 of the support 10 may already be fastened to a common substrate, for example by a screw, a bolt or a fastening clip. By way of non-limiting examples, the common substrate may be a printed circuit board, or a mechanical flank or support of a housing of an electrical module. The respective hook and lip shapes are advantageously complementary so as to form a partial or complete attachment system (or more generally an attachment) 1112 between the two parts 11 and 12 of the busbar support 10. Advantageously, a hook-type attachment 1112 thus created makes it possible to limit the movements of the parts 11 and 12 relative to one another, and to create a kind of pivot connection between the two parts 11 and 12 of the busbar support 10, as shown in FIG. 3. Specifically, once the hook shape 11f of the part 11 has engaged with the lip 12f of the part 12, the movement of the part 11 back to its original position (prior to convergence of the two parts) is limited, this making it possible to provide a shape for rapid guidance toward the final position of the part 11 (after the part 11 has been assembled facing the part 12 and against the latter) of the busbar support 10. Advantageously, the final positioning of the part 11 of the busbar support 10 in the configuration shown in FIG. 4 provides for framing or pinching of the busbar 20, which then occupies the through-cavity 14 formed by the two assembled parts 11 and 12. The parts 11 and 12 of the busbar support 10 thus together form a guide and/or a vise for the busbar 20, depending on the dimensions and/or tolerances chosen. To this end, and according to the example described, the part 11 also has two surfaces 11a and 11b which are perpendicular to one another and form an angle (an angle bracket) for positioning the busbar 20. According to one embodiment, one or other of the parts 11 and 12 is manufactured from a polymer material, and the other of the parts is made of an at least slightly deformable elastomer material, the mechanical characteristics of which (and the dimensions of which) make it possible to pressurize the two parts 11 and 12 against surfaces of the busbar 20 after the busbar support 10 has been assembled. In other words and according to such a configuration, the busbar 20 is then pinched between the two parts 11 and 12 of the busbar support 10. Once the assembly configuration shown in FIG. 4 has been implemented, that is to say when the base 11c of the part 11 has been positioned so as to bear against the substrate carrying the part 12, the assembly of the parts 11 and 12 on the substrate can be finalized by fastening the part 11 to the substrate if the part 12 has already been fastened thereto, or by fastening the two parts 11 and 12 to the substrate if the part 12 has not already been fastened thereto.

Advantageously, the use of insulating materials for the manufacture of the two parts 11 and 12 of the busbar support makes it possible to reduce the risks of a short circuit, in particular in the presence of a foreign electrically conductive body.

According to one embodiment, the materials used for the manufacture of the parts 11 and 12 of the busbar support 10 have a melting temperature greater than 150° C., and this makes it possible to prevent any substantial deformation of the parts at a busbar temperature of less than or equal to 150° C.

Figure 5:
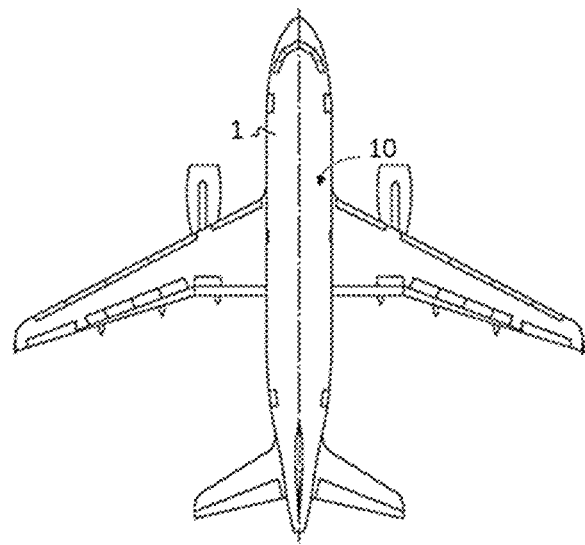
FIG. 5 illustrates an aircraft comprising a busbar support as already shown in FIG. 1 to FIG. 4.

FIG. 5 shows an aircraft 1 comprising the busbar support 10 which is particularly suitable for the needs of transporting energy in a busbar, between an electric generator or an electrical energy store on the one hand, and an aircraft module consuming electrical energy on the other hand. According to one embodiment, the aircraft 1 is an aircraft comprising one or more electric motors suitable for propulsion thereof, this requiring a considerable transport of electrical energy between the current sources and the motor or motors, notably, and consequently a possible increased use of busbar-type conductors in the aircraft 1.

The disclosure herein is not limited to just the embodiments and examples described, but relates more generally to any busbar support which is arranged in two parts and which has a through-opening after assembly for the holding of a busbar, an attachment system between the two parts by cooperation of complementary shapes arranged in each of the two parts, respectively, and a fastener for fastening to a substrate, the fastener being situated in a base of each of the two parts.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support for a busbar, comprising:
   a first part comprising:
   a first base comprising a hole or a fastener and a first bearing surface configured to bear against a substrate;
   a first sub-part extending from the first base, the first sub-part defining a first lower mating surface and a first upper mating surface spaced apart from the first lower mating surface by a first angle; and
   a first attachment feature; and
   a second part comprising:
   a second base comprising a hole or a fastener and a second bearing surface configured to bear against the substrate;
   a second sub-part extending from the second base, the second sub-part defining a second lower mating surface and a second upper mating surface spaced apart from the second lower mating surface by a second angle;
   a second attachment feature having a shape that is complementary to a shape of the first attachment feature;
   wherein the first base and the second base are configured to be arranged with the first lower mating surface abutting the second lower mating surface and with the first upper mating surface abutting the second upper mating surface, wherein the first angle and the second angle define a through-cavity or a passage; and
   wherein the first attachment feature and the second attachment feature are configured to engage one another to provide an attachment between the first part and the second part.

2. The busbar support of claim 1, wherein the first angle comprises two surfaces that are substantially planar and perpendicular to one another; and wherein the second angle comprises two surface that are substantially planar and perpendicular to one another.

3. The busbar support of claim 1, wherein one of the first attachment feature or the second attachment feature comprises a hook or has a profile in a form of a hook.

4. The busbar support of claim 1, wherein the first base and the second base together form a planar sole.

5. The busbar support of claim 1, wherein the attachment between the first part and the second part is configured to limit movement of the first part with respect to the second part in at least two directions of movement perpendicular to one another.

6. The busbar support of claim 1, wherein the first part and the second part are manufactured from an insulating material.

7. The busbar support of claim 6, wherein the insulating material is a polymer or an elastomer having a melting temperature greater than 150° C.

8. The busbar support of claim 1, wherein the through-cavity or the passage has a parallelepipedal overall shape.

9. A busbar fastening assembly comprising a substrate, two screws or two fastener and the busbar support of claim 1, the assembly configured to receive a busbar positioned in the through-cavity or the passage of the support when the two parts are assembled on the substrate.

10. An aircraft having the busbar fastening assembly of claim 9.

11. An aircraft having the busbar support of claim 1.

12. The busbar support of claim 1, wherein the first part comprises a first reinforcing rib joining the first base and the first sub-part; and
   wherein the second part comprises a second reinforcing rib joining the second base and the second sub-part.

13. The busbar support of claim 1, wherein the first part is manufactured from a polymer material and the second part is manufactured from an elastomer material.

* * * * *